United States Patent

[11] 3,602,825

[72] Inventor Edwin W. Senior
Sunnyvale, Calif.

[21] Appl. No. 729,707
[22] Filed May 16, 1968
[45] Patented Aug. 31, 1971
[73] Assignee Sylvania Electric Products Inc.

[54] PULSE SIGNAL AUTOMATIC GAIN CONTROL SYSTEM INCLUDING A RESETTABLE DUMP CIRCUIT
12 Claims, 8 Drawing Figs.

[52] U.S. Cl. .......... 328/58, 307/229, 307/234, 307/235, 307/246, 307/267, 307/264, 328/115, 328/151
[51] Int. Cl. .......... H03k 5/04, H03k 5/20
[50] Field of Search .......... 307/229, 230, 232, 233, 234, 235, 246, 264, 265, 267; 328/109, 110, 115–117, 120, 135, 140, 141, 150, 151, 162, 168; 329/102, 104, 109, 130, 131–134

[56] References Cited

UNITED STATES PATENTS

| | | | |
|---|---|---|---|
| 3,448,296 | 6/1969 | Schwaninger | 307/267 |
| 3,139,539 | 6/1964 | Hewett | 307/234 X |
| 3,206,689 | 9/1965 | Santana | 307/246 X |
| 3,212,014 | 10/1965 | Wiggins et al. | 307/235 X |
| 3,225,213 | 12/1965 | Hinrichs et al. | 328/162 X |
| 3,348,115 | 10/1967 | Orton | 328/151 X |
| 3,375,450 | 3/1968 | Ayres et al. | 328/150 |
| 3,388,266 | 6/1968 | Kjar | 307/235 X |
| 3,408,588 | 10/1968 | Rugo | 328/135 X |
| 3,469,197 | 9/1969 | Ryan | 328/150 |
| 3,471,832 | 10/1969 | Pawletko | 307/264 X |

*Primary Examiner*—Stanley D. Miller, Jr.
*Attorneys*—Norman J. O'Malley, John F. Lawler and Russell A. Cannon

ABSTRACT: The feedback circuit associated with the gain control element of this AGC system comprises a boxcar pulse stretcher including an automatic dump circuit. The pulse stretcher comprises a sample gate which controls application of input pulses to a storage capacitor. The dump circuit comprises a resettable dump pulse generator which produces control pulses that open a dump gate and discharge the capacitor. A sample pulse generator is responsive to input pulses for controlling operation of the dump generator and the sample gate. If the amplitude of an input pulse is greater than a first preset threshold level, the sample generator resets the dump generator to prevent discharge of the capacitor and opens the sample gate to enable the capacitor to charge to the amplitude of and to store the input pulse. If the amplitude of the next input pulse is greater than the first threshold, the sample generator again inactivates the dump generator and opens the sample gate to enable the capacitor to charge to the amplitude of and to store the new pulse. If the amplitude of the input pulse is less than the first threshold, the sample gate remains closed and the dump generator automatically opens the dump gate and discharges the capacitor after a prescribed time interval. If the voltage stored by the capacitor exceeds a second threshold level it is coupled to the gain control element to control the gain of the system.

INVENTOR.
EDWIN W. SENIOR

BY Russell A. Cannon

AGENT

INVENTOR.
EDWIN W. SENIOR
BY Russell A. Cannon
AGENT

INVENTOR.
EDWIN W. SENIOR

BY Russell A Cannon

AGENT

INVENTOR.
EDWIN W. SENIOR
BY Russell A. Cannon
AGENT

PULSE SIGNAL AUTOMATIC GAIN CONTROL SYSTEM INCLUDING A RESETTABLE DUMP CIRCUIT

BACKGROUND OF INVENTION

This invention relates to automatic gain control (AGC) and more particularly to a pulse signal AGC system.

An AGC system is basically a two-port network having a gain that is a function of the signal passing through it. The system is employed to maintain a nearly constant signal level at the output port without producing distortion or attenuation of information on the input signal. It comprises two basic components: a gain control element (GCE) and a control signal processor (CSP). The GCE is a three-port device having an input port, an output port, and a gain control port receiving a control signal for changing the gain between the input and output ports. The CSP is a two-port device that converts the output signal of the GCE to a suitable control signal such as a voltage.

AGC systems are employed to suppress low-frequency fluctuations in signal strength without distorting information-carrying high frequency modulation. For example, the AGC system may be employed to maintain the video output of a tracking receiver at an essentially constant level over wide variations of input signal strength without degrading square wave amplitude modulation which carries lobing information used for tracking. In a relatively simple AGC system, a low-pass filter may make up the entire CSP. Such a CSP circuit is inadequate for pulse signals, however, since the DC component and control signal extracted by the filter is a function of the duty cycle of the pulse.

The prior art pulse signal AGC system includes a sample-hold circuit pulse stretcher with amplitude thresholding ahead of the low-pass filter to generate a DC level proportional to pulse amplitude and independent of pulse width, pulse repetition frequency and duty cycle. The sample-hold circuit comprises a sample gate which is opened to couple an input pulse to a storage capacitor when the amplitude of the pulse exceeds a preset threshold level. This system has the disadvantage that it may become "paralyzed" or locked in a low-gain mode by a strong noise spike or interfering signal. If an interfering pulse is strong enough, the gain reduction it causes will drive the amplitude of succeeding input pulses below the threshold level required to trigger the sample gate. The system may then be incapable of recovering from this effect of such a noise spike for a considerable period of time. If a shunt resistor is used to discharge the storage capacitor and enable the system to recover from the effects of such noise spikes in a short time, the system suffers from sag and PRF dependence. The use of an amplitude-only threshold criterion is also undesirable, as band-limited input pulses with slow rise and fall times may be sampled on their leading or trailing edges instead of at their peaks.

The object of this invention is the provision of an improved pulse signal AGC system.

SUMMARY OF INVENTION

In accordance with this invention, a pulse passed by a gain control element and satisfying first threshold criteria of a first detector circuit is coupled to a circuit that stores the pulse. If the next pulse also satisfies the first threshold criteria, it is coupled to the storage circuit which now stores the new pulse. If another pulse satisfying the first threshold criteria is not received within a predetermined time interval, the stored signal is automatically dumped by the storage circuit. The signal stored by the storage circuit is applied to the gain control element to change the gain thereof if the amplitude of the stored signal exceeds a second threshold.

DESCRIPTION OF PREFERRED EMBODIMENT

Figure 1:
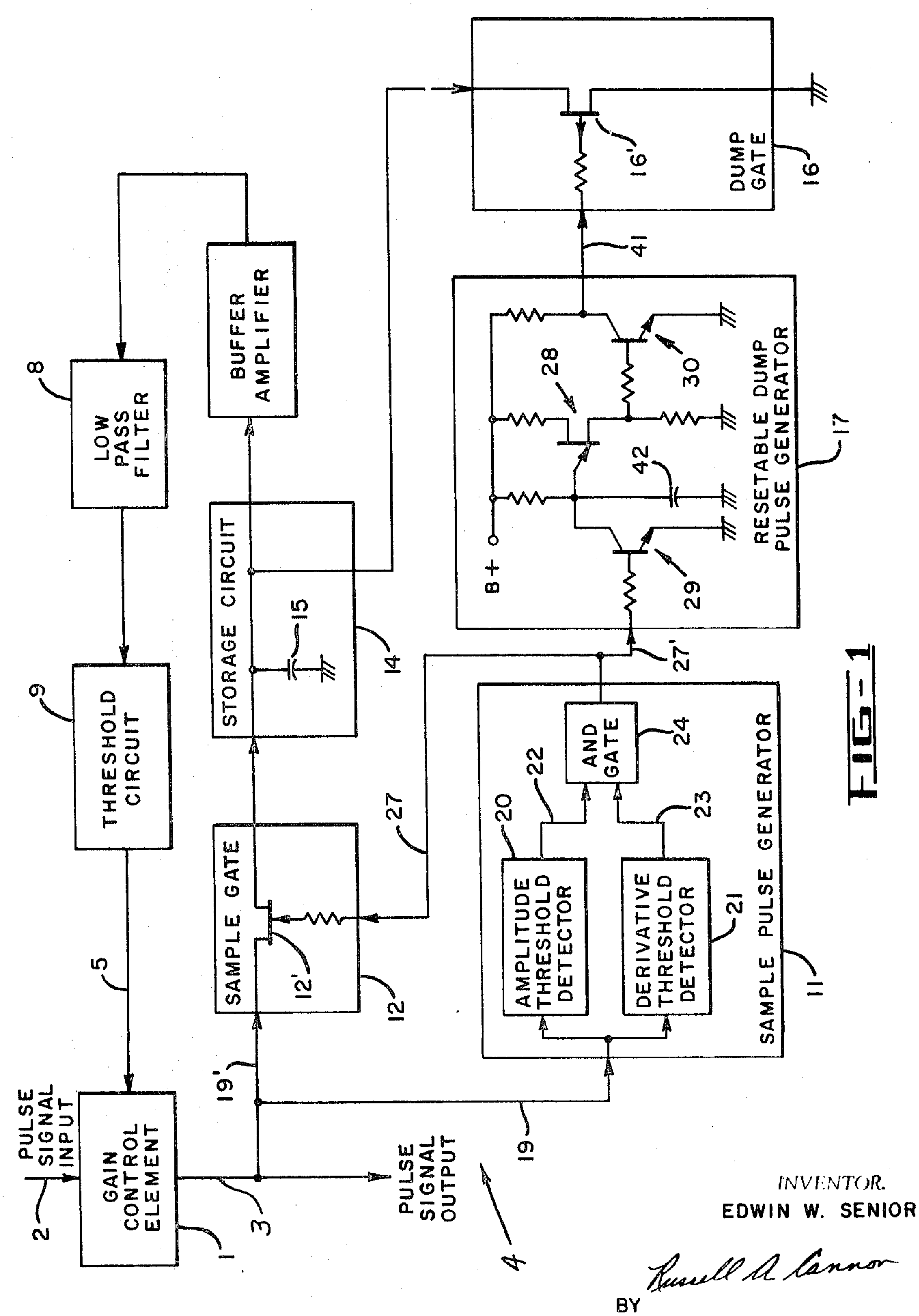
FIG. 1 is a circuit and block diagram of a pulse signal AGC system embodying this invention.

Referring now to FIG. 1, the pulse signal AGC system comprises gain control element (GCE) 1 receiving pulses on line 2 and control signal processor (CSP) 4. The CSP is responsive to the output of the GCE on line 3 for producing a control voltage which is applied on line 5 to the GCE. The CSP comprises a low-pass filter 8, a threshold circuit 9 and a boxcar pulse stretcher including sample pulse generator 11, sample gate 12 and storage circuit 14. The pulse stretcher also includes an automatic dump circuit comprising dump gate 16 and resettable dump pulse generator 17.

Sample generator 11 comprises amplitude threshold detector 20, derivative threshold detector 21 and AND gate 24. Detector 20 produces a positive output pulse on line 22 when the amplitude of a pulse on line 19 is greater than a preset threshold level $+K_1$. Detector 21 produces a negative output pulse on line 23 when the amplitude of the derivative of a pulse on line 19 is less than a specified threshold level $-K_2$. When a positive output is simultaneously present on lines 22 and 23, AND gate 24 changes operating states and produces a gating pulse on line 27 which opens the sample gate.

Sample gate 12 and dump gate 16 each comprises an FET switch. Storage circuit 14 comprises a capacitor 15. Dump generator 17 comprises a unijunction transistor oscillator 28, a transistor reset switch 29 and a saturating transistor amplifier 30.

Figure 2:
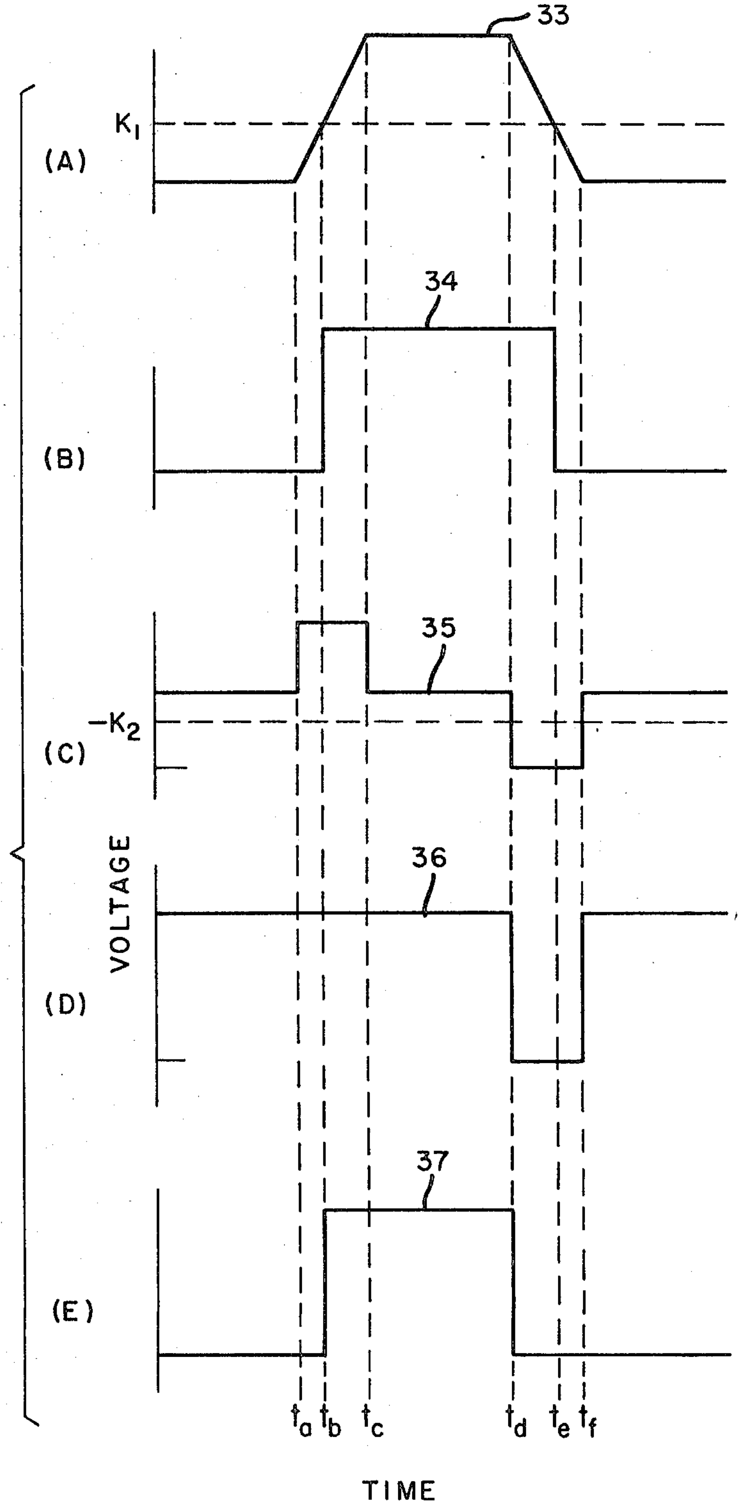
FIGS. 2 and 3 are waveforms which illustrate the operation of the invention.

The operation of sample generator 11, sample gate 12 and storage circuit 14 will now be described in relation to the waveforms of FIG. 2 wherein waveform 33 in FIG. 2A represents a band-limited input pulse on lines 19 and 19'; waveform 34 in FIG. 2B represents the output of detector 20 on line 22; waveform 35 in FIG. 2C represents the time derivative of waveform 33; waveform 36 in FIG. 2D represents the output of detector 21 on line 23; and waveform 37 in FIG. 2E represents the output of AND gate 24 on line 27. During the time interval $t_b$ through $t_e$, the amplitude of pulse 33 exceeds the amplitude threshold level $+K_1$ and detector 20 generates the pulse 34 on line 22. Detector 21 takes the time derivative of pulse 33 (see FIG. 2C) and produces output pulse 36 on line 23. When the derivative falls below the threshold level $-K_2$ at time $t_d$ the output of the derivative threshold circuit is zero. Since the voltages on lines 22 and 23 are both positive between time $t_b$ to $t_d$ AND gate 24 produces the pulse 37 on line 27.

Gate pulse 37 forward biases FET switch 12' to open the sample gate and couple pulse 33 to the storage circuit. Capacitor 15 charges to the peak amplitude of pulse 33. When the sample gate is closed at time $t_d$, the charge on the capacitor is stored until either the sample gate or the dump gate is opened. If the voltage stored by the capacitor is larger than the amplitude of the next input pulse on line 19' when the sample gate is opened, current flows out of capacitor 15 and the capacitor voltage is pulled down to the value of the input pulse.

If pulses 37 from AND gate 24 are absent from line 27', switch 29 is cutoff and oscillator 28 is free running. The output of the oscillator is a train of pulses on line 41 each of which forward biases FET switch 16' to open the dump gate and discharge capacitor 15. Whenever a sample pulse 37 occurs on line 27' transistor 29 conducts and discharges capacitor 42. This causes oscillator 28 to reset to the beginning of its timing cycle no matter where in its cycle the sample pulse 37 occurred. If sample pulses occur more frequently than the natural frequency of oscillation of oscillator 28, the oscillator will be completely inhibited and will generate no dump pulses on line 41. The period of oscillator 28 is preferably slightly larger than the period of the input pulses at the lowest expected PRF.

Figure 3:
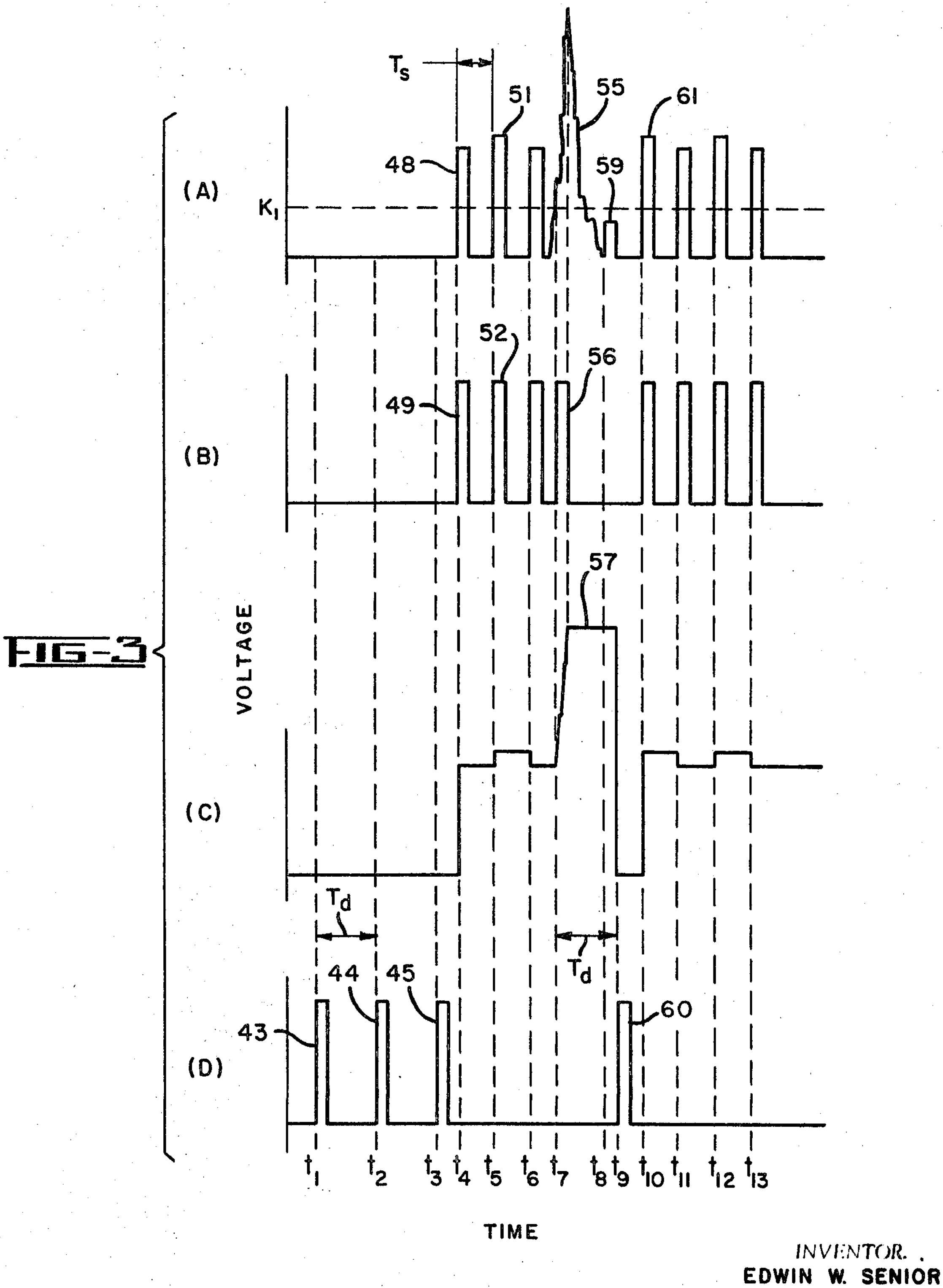

The operation of the system of FIG. 1 will now be described in relation to the waveforms of FIG. 3 wherein the waveform of FIG. 3A represents input pulses and impulse noise on lines 19 and 19', the waveform of FIG. 3B represents sample gate pulses on line 27, the waveform of FIG. 3C represents the signal stored by the storage circuit and the waveform of FIG. 3D represents dump pulses on line 41. Prior to time $t_4$, the inputs on lines 2 and 19 are zero. Sample pulses are therefore absent from the output of generator 11 on lines 27 and 27'. Transistor switch 29 is cutoff by the voltage on line 27' so that oscillator 28 operates at its natural frequency of oscillation and produces dump pulses 43, 44 and 45 (see FIG. 3D), each of which opens gate 16 and dumps any signal stored by capacitor 15. The period of oscillator 28 is the time interval $T_d$.

The amplitude of input pulse 48 (see FIG. 3A) on line 19 exceeds threshold $-K_1$ of detector 20 and the sample generator produces sample pulse 49 which opens the sample gate to allow the storage capacitor to charge to the magnitude of pulse 48 as indicated in FIG. 3C, time $t_4$. The sample pulse on line 27' at time $t_4$ causes transistor 29 to conduct to discharge capacitor 42 and reset the oscillator. Thus, generator 17 does not produce a dump pulse within the time interval $T_d$ that is subsequent to the time $t_3$ (see FIG. 3D).

The amplitude of pulse 51 on line 19 also exceeds the threshold $+K_1$ and the sample generator produces pulse 52 which opens the sample gate to connect pulse 51 to the storage capacitor. Since the period $T_s$ of pulses 48 and 51 on line 19 is less than the period $T_d$ of oscillator 28, transistor 29 is again caused to conduct by the voltage on line 27' and the oscillator is reset at time $t_5$. The signal level stored by capacitor 15 therefore increases from that previously stored to the magnitude of pulse 51.

At time $t_7$ a large noise spike 55 occurs on input lines 2 and 19. This noise spike causes generator 11 to produce sample pulse 56 which opens the sample gate to allow capacitor 15 to charge to the amplitude of the noise. The large voltage 57 stored by capacitor 15 causes a large reduction of the gain of gain control element 1. This reduction in gain causes the amplitude of the next pulse 59 in a desired input pulse train to fall below the threshold level $+K_1$. Generator 11 therefore does not produce a sample pulse at time $t_8$ (FIG. 3B). Since a sample pulse is not produced on line 27' during the period $T_d$, that is subsequent to the time $t_7$, oscillator 28 produces a dump pulse 60 at time $t_9$ (FIG. 3D) which opens dump gate 16 and discharges the storage capacitor. The control signal on line 5 is therefore zero at time $t_9$ and the gain of control element 1 is increased. This increased gain causes the next pulse 61 in the desired input pulse train to exceed the threshold $+K_1$ and the system resumes normal operation. The effect of the noise spike is thus minimized by this invention since its effects persist only from time $t_7$ to time $t_9$.

Figure 4:
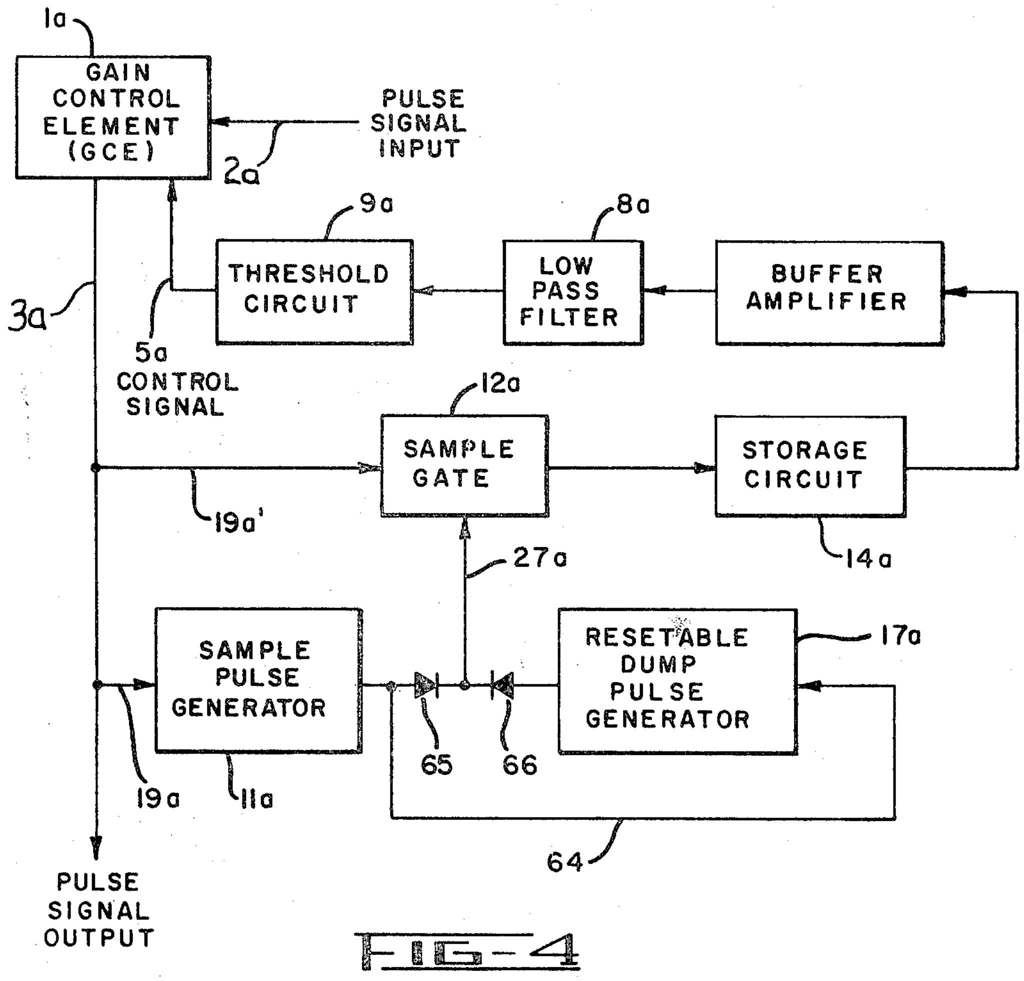
FIG. 4 is a circuit and block diagram of a pulse signal AGC system embodying a modified form of this invention.

A pulse signal AGC system embodying a modified form of this invention is illustrated in FIG. 4. The circuits of FIGS. 1 and 4 are similar in structure and operation although the latter does not employ a dump gate. Reference characters with the suffix *a* in FIG. 4 refer to similar elements in FIG. 1. Referring now to FIG. 4, the output of sample generator **11*a* is coupled on line 64 to the input of dump pulse generator 17*a* and through diode 65 and line 27*a* to the sample gate. Dump generators 17 and 17*a* differ in that the output of the latter is positive rather than negative in order to match the input to the FET sample gate. The outputs of the gate generator and dump generator are isolated from each other by diodes 65 and 66**.

In operation, when pulses that satisfy the threshold criteria of generator **11*a* are present on line 19*a*, the sample generator produces sample pulses that reset dump generator 17*a* and open sample gate 12*a* as described above. If input pulses satisfying the threshold criteria of the sample generator are absent from line 19*a* for a time interval greater than the period $T_d$ of generator 17*a*, a dump pulse is produced which opens sample gate 12*a*** to enable the storage circuit to sample the input pulse regardless of the value of the stored signal or the input pulse.

Figure 5:
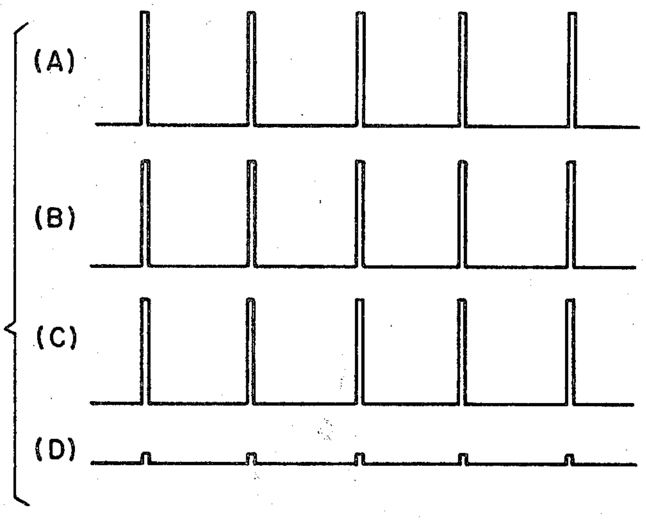
FIGS. 5A through 5D are waveforms illustrating the comparative operation of a prior art system and the system of FIG. 1.

The operation of an actual system embodying the invention of FIG. 1 and a prior art system which does not include automatic dump of the signal contained in the storage circuit is illustrated by the waveforms of FIGS. 5A and 5C and FIGS. 5B and 5D, respectively. The waveforms are reproductions of photographs of the voltage stored by the storage circuit. The waveforms in FIGS. 5A and 5B illustrate the operation of the two systems in response to identical input pulse trains having 50 microsecond pulse widths and 1 kHz. pulse repetition frequencies. The waveforms of FIGS. 5C and 5D illustrate the operation of the systems when impulse noise simulated by pulses having a 50- microsecond pulse width and a 20 Hz. pulse repetition frequency is added to the original pulse trains. The simulated noise pulses are 26 db. stronger than the desired original input pulses. The waveform of FIG. 5C shows that the AGC system embodying this invention is relatively insensitive to the interfering pulses. The waveform of FIG. 5D, however, shows that the prior art AGC system became locked in a low-gain mode of operation and almost completely suppressed the desired pulses.

Although this invention is described in relation to specific embodiments thereof, variations and modifications will be apparent to those skilled in the art. By way of example, OR gates may be employed instead of diodes 65 and 66. Also, the frequency of oscillation of oscillator 28 may be variable and a circuit responsive to the input pulses may be employed to automatically adjust the dump pulse period in order to operate on input pulses having a wide range of PRF's. The scope and breadth of this invention is therefore to be determined from the following claims rather than from the above detailed description.

What is claimed is:

1. A pulse signal automatic gain control system comprising a gain control element having an input terminal receiving input pulses, having an output terminal and having a control terminal, a first gate circuit having an input terminal connected to the output terminal of said gain control element, having an output terminal and having a control terminal, a first pulse generator having an input terminal connected to the output terminal of said gain control element and having an output terminal, first means connecting the output terminal of said first generator to the control terminal of said first gate, said first generator producing a first control pulse when an input pulse passed by said gain control element satisfies prescribed criteria, said first control pulse opening said first gate, means producing a second control pulse when the time interval between successive first control pulses is greater than a predetermined time interval, means sequentially storing input pulses passed by said first gate and being responsive to the second control pulses for changing the stored signal, and means coupling the stored signal to the control terminal of said gain control element when the amplitude of the stored signal exceeds a first prescribed threshold level.

2. The system according to claim 1 wherein said second control pulse producing means comprises a second pulse generator having an input terminal connected to the output terminal of said first generator and having an output terminal, said second generator producing second control pulses having a pulse repetition frequency equal to the reciprocal of the predetermined time interval and being responsive to first control pulses for resetting the time of generation of second control pulses, and second means connecting the output terminal of said second generator to the control terminal of said first gate.

3. The system according to claim 2 wherein said first and second connecting means each comprise a diode.

4. The system according to claim 1 wherein said second control pulse producing means comprises
a third pulse generator having an input terminal connected to the output terminal of said first generator and having an output terminal, said third generator producing second control pulses having a pulse repetition frequency equal to the reciprocal of the predetermined time interval and being responsive to first control pulses for resetting the time of generation of second control pulses, and
a second gate circuit having a first terminal connected to a reference potential, having a second terminal coupled to said storage means and having a third terminal connected to the output terminal of said third generator, said second gate being responsive to the second control pulses for dumping the signal stored by said storage means.

5. The system according to claim 4 wherein said third pulse generator comprises
a free-running oscillator producing a train of second control pulses, and
an inhibit circuit responsive to first control pulses for resetting said oscillator to change the time of generation of succeeding second control pulses.

6. The system according to claim 1 wherein said first pulse generator comprises a first threshold detector which changes operating states when the amplitude of an input pulse exceeds a second prescribed threshold level.

7. The system according to claim 6 wherein said first pulse generator includes
a second threshold detector which changes operating states when the amplitude of the derivative of an input pulse crosses a third prescribed threshold level, and
a circuit for logically combining the output signals of said first and second detector circuits for producing the first control signal.

8. A pulse stretcher comprising first means sequentially selectively passing input pulses satisfying prescribed criteria,
second means responsive to the operation of said first means and continuously producing first control pulses at a prescribed rate whenever the time intervals between successive input pulses passed by said first means are greater than a predetermined time interval, and
means sequentially storing input pulses passed by said first means and responsive to generation of said first control pulses for changing the signal stored thereby.

9. The pulse stretcher according to claim 8 wherein said first means is responsive to input pulses satisfying the prescribed criteria for producing second control pulses, said second means comprising
a pulse generator producing the first control pulses which have a natural pulse repetition frequency equal to the reciprocal of the predetermined time interval, said generator being responsive to the second control pulses for resetting said generator and changing the time of generation of first control pulses thereby, and
a gate circuit responsive to a first control pulse for dumping the signal stored by said storage means.

10. The pulse stretcher according to claim 9 wherein said first means comprises
a threshold detector receiving input pulses and changing operating states when the amplitude of the derivative of an input pulse is less than a prescribed threshold level.

11. A pulse stretcher comprising
first means sequentially selectively passing input pulses satisfying prescribed criteria,
second means responsive to the operation of said first means and producing a first control pulse when the time interval between successive input pulses passed by said first means is greater than a predetermined time interval, and
means sequentially storing input pulses passed by said first means and responsive to generation of said first control pulse for changing the signal stored thereby,
said first means being responsive to input pulses satisfying the prescribed criteria for producing second control pulses, said first means comprising
a first threshold detector receiving input pulses and changing operating states when the amplitude of the derivative of an input pulse is less than a first prescribed threshold level,
a second threshold detector responsive to input pulses for changing operating states when the amplitude of an input pulse exceeds a second prescribed threshold level, and
a circuit for logically combining the output signals of said first and second detectors for producing the second control pulses,
said second means comprising
a pulse generator producing the first control pulses which have a natural pulse repetition frequency equal to the reciprocal of the predetermined time interval, said generator being responsive to the second control pulses for resetting said generator and changing the time of generation of first control pulses thereby, and
a gate circuit responsive to a first control pulse for dumping the signal stored by said storage means.

12. A pulse stretcher comprising
first means sequentially selectively passing input pulses satisfying prescribed criteria,
second means responsive to the operation of said first means and producing a first control pulse when the time interval between successive input pulses passed by said first means is greater than a predetermined time interval, and
means sequentially storing input pulses passed by said first means and responsive to generation of said first control pulse for changing the signal stored thereby,
said first means comprising
a gate circuit having an input terminal receiving input pulses, having an output terminal and having a control terminal, and
a first pulse generator having an input terminal receiving input pulses and having an output terminal electrically coupled to the control terminal of said gate, said first generator being responsive to an input pulse satisfying the prescribed criteria for producing a second control pulse which opens said gate to connect the input pulse to said storage means,
said second means comprising a second pulse generator having an input terminal connected to the output terminal of said first generator and having an output terminal electrically coupled to the control terminal of said gate, said second generator producing the first control pulses which have a natural pulse repetition frequency equal to the reciprocal of the predetermined time interval, said second generator being responsive to second control pulses for resetting the second generator and the time of generation of first pulses thereby.